(12) United States Patent
Tillotson et al.

(10) Patent No.: US 9,482,795 B2
(45) Date of Patent: Nov. 1, 2016

(54) METHOD AND SYSTEM FOR RETROREFLECTIVE COOLING

(71) Applicant: The Boeing Company, Chicago, IL (US)

(72) Inventors: Brian J. Tillotson, Kent, WA (US); Zach J. Harris, Dallas, TX (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 13/900,143

(22) Filed: May 22, 2013

(65) Prior Publication Data

US 2014/0347731 A1 Nov. 27, 2014

(51) Int. Cl.
| | | |
|---|---|---|
| G02B 5/122 | (2006.01) | |
| E04B 1/74 | (2006.01) | |
| G02B 5/124 | (2006.01) | |
| G02B 5/128 | (2006.01) | |
| E04B 1/76 | (2006.01) | |

(52) U.S. Cl.
CPC .............. G02B 5/122 (2013.01); E04B 1/74 (2013.01); G02B 5/124 (2013.01); G02B 5/128 (2013.01); E04B 2001/7691 (2013.01)

(58) Field of Classification Search
CPC ........ G02B 5/12; G02B 5/122; G02B 5/124; G02B 5/126; G02B 5/13; G02B 5/132; G02B 5/134; G02B 5/136; E04B 1/74; E04B 2001/7691; E06B 2009/2417; E06B 9/24
USPC .......................... 359/529–533, 536, 542, 543
See application file for complete search history.

(56) References Cited

U.S. PATENT DOCUMENTS

| | | | |
|---|---|---|---|
| 3,220,871 A | 6/1953 | Lemelson | |
| 3,741,623 A * | 6/1973 | Mihalik | G02B 5/124 |
| | | | 359/528 |

(Continued)

FOREIGN PATENT DOCUMENTS

| | | |
|---|---|---|
| EP | 2397323 | 12/2011 |
| GB | 1575048 | 9/1980 |

(Continued)

OTHER PUBLICATIONS

Extended European Search Report, Patent Application No. 14161468 dated Oct. 15, 2014.

(Continued)

*Primary Examiner* — Bumsuk Won
*Assistant Examiner* — Ephrem Mebrahtu
(74) *Attorney, Agent, or Firm* — Kunzler Law Group, PC

(57) ABSTRACT

An apparatus for inhibiting heating of an enclosure is disclosed. The apparatus comprises a covering configured to shade at least a portion of a surface of the enclosure and includes a plurality of retroreflective elements. The plurality of retroreflective elements are configured to retroreflect electromagnetic beams primarily at wavelength in a range between about 380 nm and about 780 nm or sub-range thereof. The plurality of retroreflective elements receive the electromagnetic beams along beam entry paths and reflect the electromagnetic beams along beam exit paths. The beam entry paths and the beam exit paths have substantially the same elevation angle and may also have substantially the same azimuthal angle. Further, the plurality of retroreflective elements may include retroreflective elements configured to diffusively and/or specularly scatter audible sound wavelengths, RF wavelengths, and/or thermal infrared energy.

25 Claims, 14 Drawing Sheets

(56) References Cited

U.S. PATENT DOCUMENTS

| | | | |
|---|---|---|---|
| 4,160,577 | A | 7/1979 | Berg |
| 4,303,144 | A | 12/1981 | Wirt et al. |
| 8,375,933 | B2 | 2/2013 | Myers |
| 2011/0170193 | A1* | 7/2011 | Budd et al. .................. 359/518 |
| 2011/0256350 | A1* | 10/2011 | Ito .......................... G02B 5/045 428/156 |
| 2012/0300306 | A1 | 11/2012 | Nagahama et al. |
| 2014/0345967 | A1 | 11/2014 | Tillotson et al. |

FOREIGN PATENT DOCUMENTS

| | | |
|---|---|---|
| JP | 2006317648 | 11/2006 |
| JP | 2011221105 | 11/2011 |
| JP | 2012242509 | 12/2012 |
| NL | 8800294 | 9/1989 |
| WO | 2009094515 | 7/2009 |

OTHER PUBLICATIONS

Eckhardt, H, "Simple Model of Corner Reflector Phenomena," Appl. Opt. 10, 1559-1566 (1971).

Lou, Y., Wang, H., Liu, Q., Shi, Y., and He, S., "Analysis and Fabrication of Corner Cube Array Based on Laser Direct Writing Technology," Appl. Opt. 49, 5567-5574 (2010).

Spencer, R.C., "Optical Theory of the Corner Reflector," MIT Report 443, Mar. 1944.

Office Action for Canadian Application No. 2,845,905 dated Dec. 21, 2015.

Notice of Allowance for U.S. Appl. No. 13/900,066 dated Dec. 3, 2015.

Office Action for Mexican Patent Application No. MX/a/2014/005465 dated Jul. 20, 2015.

European Patent Office Examination Report for Application No. 14161459.4 dated Jul. 17, 2015.

Office Action for Canadian Patent Application No. 2,845,905 dated Mar. 26, 2015.

European Search Report and Written Opinion for Application No. 14161459.4 dated Oct. 17, 2014.

Office Action for Canadian Patent Application No. 2,845,167 dated Apr. 27, 2015.

Examination report for Application No. 14161468.5 dated Jul. 21, 2015.

Examination Report for European Application No. 14161468.5 dated Apr. 19, 2016.

Office Action for Canadian Application No. 2,845,167 dated Feb. 19, 2016.

* cited by examiner

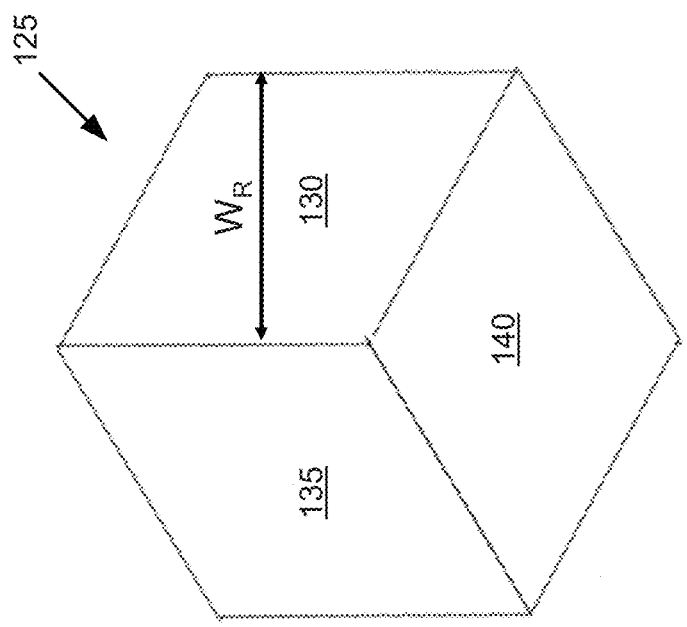
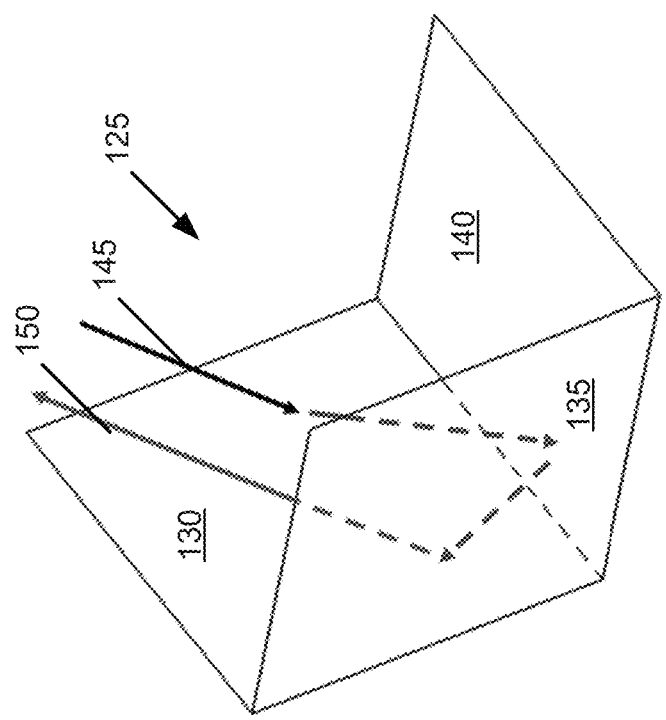

METHOD AND SYSTEM FOR RETROREFLECTIVE COOLING

BACKGROUND

People and objects gain or lose heat through four mechanisms: conduction, convection, evaporation, and radiation. These mechanisms affect whether an office building, a server farm, an airplane factory, an airline hangar, maintenance hangar, or other form of enclosure (inclusive of complete and partial enclosures) is maintained at a tolerable temperature during hot weather in summer, or at other locations having high temperatures. In each instance, the ability to cool the object, such as a building, may be inhibited through exposure to direct and reflected (indirect) sunlight. If direct and indirect sunlight are reduced, the ability to effectively and economically keep the enclosure cool increases.

Direct heating, as applied to sunlight, refers to sunlight (a) arriving directly at a building's surface from the sun and (b) getting absorbed as heat at that surface. Indirect heating occurs when sunlight is reflected or scattered from a building's outer wall, and then does one of the following:
1. Gets absorbed by a nearby building, person, or vehicle that is to be kept cool (e.g., an airliner parked near a terminal building);
2. Gets reflected from nearby terrain, buildings, or vehicles back to the original building, where it is absorbed as heat; or
3. Gets absorbed by terrain near the building, e.g., parking lots, lawns, or airport tarmac. This heats the nearby portion of the Earth's surface. That heated terrain, which may include man-made objects on the terrain, increases the heat load of the original building by three mechanisms: (a) infrared radiation, (b) convective heating as air from the hot surface rises and blows against the building, thereby transferring heat to the outer wall or window, and (c) air from the hot surface rising and getting pulled into a heat exchanger for the building's air-conditioner, thereby reducing the air conditioner's cooling efficiency.

A number of approaches have been taken to optimize cooling of an enclosure, such as a building. One approach includes applying white paint to the roof and outer walls of the building to reflect sunlight. However, white paint scatters sunlight onto nearby surfaces that, in turn, become hotter and contribute to indirect heating of the building.

Another approach includes applying reflective coatings on building windows to reflect sunlight via specular reflection. Depending on the coating, it may also reduce absorption of infrared heat. However, reflective window coatings also reflect sunlight onto terrain near the building. This increases indirect heating of the building by backscattered sunlight and by convection.

Insulation may be installed in building walls as another approach to reduce heat transferred from the building's outer surface to the building's interior by conduction through the walls, convection between layers of the walls, and/or radiation between layers of the walls. However, insulation does not reduce temperatures outside the building, which rise in sunlight. Therefore, insulation does not address problems associated with indirect heating and lost air conditioner efficiency.

One or more of the foregoing may be used in a given building. However, in each instance, the various problems associated with each individual approach remain.

SUMMARY

An apparatus for inhibiting heating of an enclosure is disclosed. The apparatus comprises a covering configured to shade at least a portion of a surface of the enclosure and includes a plurality of retroreflective elements. The plurality of retroreflective elements are configured to retroreflect electromagnetic beams primarily at wavelength in a range between about 380 nm and about 780 nm or sub-range thereof. The plurality of retroreflective elements receive the electromagnetic beams along beam entry paths and reflect the electromagnetic beams along beam exit paths. The beam entry paths and the beam exit paths have substantially the same elevation angle. Further, the plurality of retroreflective elements may be configured so that the beam entry paths and the beam exit paths have substantially the same azimuthal angle.

The plurality of retroreflective elements may also be configured to scatter beams having other wavelengths. For example, the plurality of retroreflective elements may include retroreflective elements configured to diffusively or specularly scatter audible sound wavelengths. Further, the plurality of retroreflective elements may include retroreflective elements configured to diffusively or specularly reflect thermal infrared energy.

The plurality of retroreflective elements may take on various forms. For example, the retroreflective elements may be in the form of cube reflectors or spherical reflectors. And additionally, or in the alternative, the retroreflective elements may include a plurality of horizontal troughs having reflective surfaces.

A method for inhibiting heating of an enclosure is also disclosed. The method comprises placing a covering in a position to shadow at least a portion of a surface of the enclosure from electromagnetic energy. Electromagnetic beams are reflected from the covering primarily at wavelengths in a range between about 380 nm and about 780 nm or sub-range thereof. The covering receives the electromagnetic beams along beam entry paths and reflects the electromagnetic beams along beam exit paths. The beam entry paths and the beam exit paths have substantially the same elevation angle as the sun with respect to the horizon throughout a substantial portion of the day. Further, the beam entry paths and the beam exit paths may have substantially the same azimuthal angle with respect to, for example, the azimuthal position of the sun during a substantial portion of the day.

The features, functions, and advantages that have been discussed can be achieved independently in various embodiments or may be combined in yet other embodiments further details of which can be seen with reference to the following description and drawings

BRIEF DESCRIPTION OF THE DRAWINGS

FIGS. 9 and 10 shows a retroreflective element in the form of a cube reflector that may be used in the covering of FIG. 8.

DETAILED DESCRIPTION

Figure 1:
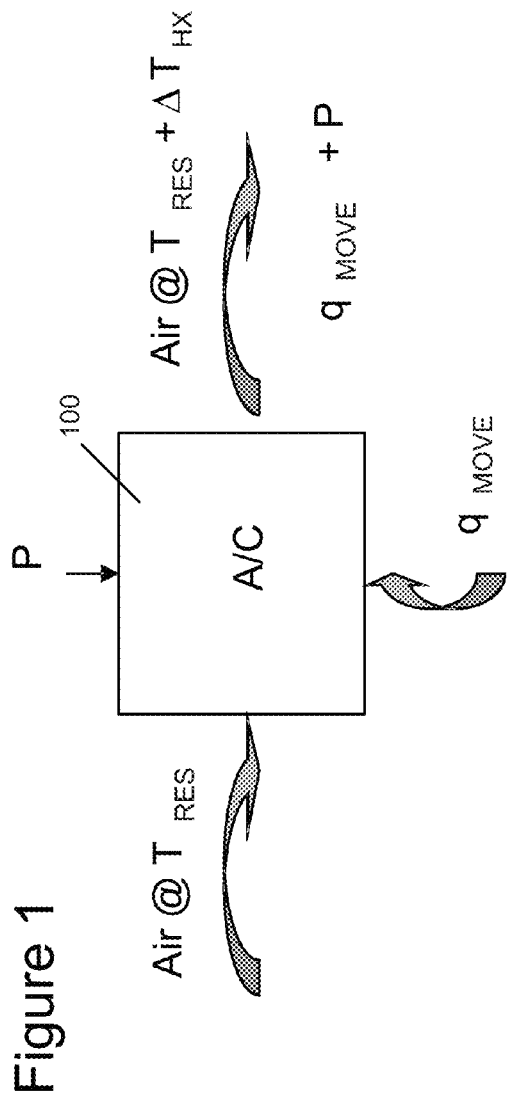
FIG. 1 shows the basic operation of an air conditioner.

FIG. 1 shows the basic operation of an air conditioner 100. The air conditioner 100 convectively removes heat at rate $q_{MOVE}$ from air in a building. To do so, it consumes electrical power P and converts that to heat, too. Via its heat exchanger, the air-conditioner 100 convectively dumps the total heat into the reservoir of external air, raising the air temperature from $T_{RES}$ to $T_{RES}+\Delta T_{HX}$.

The cost of using the air conditioner 100 has two elements: non-recurring costs and recurring costs. Non-recurring costs may include the cost of the air-conditioner 100; air ducts throughout the building; and the fraction of each building system that supports the air conditioner, e.g., the portion of the electrical system that powers the air conditioner 100, or the portion of the structure that bears the air conditioner's weight. Such non-recurring costs are generally proportional to the air conditioner's capacity in thermal Watts, i.e. the maximum rate $q_{MOVE\_max}$ at which the air-conditioner 100 can remove heat under a given set of conditions.

To hold indoor air temperature steady, the thermal power $q_{MOVE}$ that the air conditioner 100 removes from the building must equal the sum of two thermal loads:

1. $q_{LOAD}$: The heat generated by people and equipment in the building—often a fixed thermal load during working hours; and
2. $q_{ENV}$: The heat absorbed from the environment via walls, roof, and windows—a variable load that often depends on sunlight, among other factors.

That is:

$$q_{MOVE}=q_{LOAD}+q_{ENV} \quad (1)$$

Since $q_{LOAD}$ is more-or-less fixed, the maximum value of $q_{ENV}$ determines the peak thermal capacity of the air-conditioner, which drives non-recurring cost. Recurring costs include electrical power and maintenance. To this end, annual recurring costs are generally proportional to the total electrical energy (i.e. Joules) consumed by the air conditioner 100 each year. Such electrical consumption depends on efficiency of the air-conditioner 100.

Figure 2:
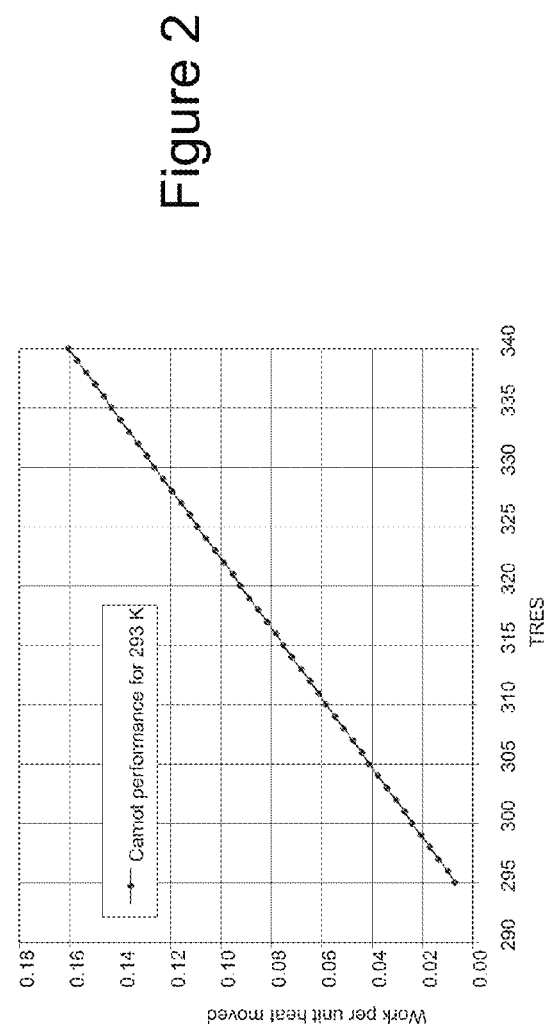
FIG. 2 is an example of how the efficiency of air-conditioner may vary with exterior air temperature.

FIG. 2 is an example of how the efficiency of air-conditioner 100 may vary with exterior air temperature, $T_{REW}$. Assuming that the indoor air temperature is held at 293° Kelvin (~20° C.), then each 10° Kelvin rise in $T_{RES}$ adds ~0.035 J to the electrical cost of removing one Joule of heat. In power terms, each 10° Kelvin rise in $T_{RES}$ adds ~0.035 W electric to the electrical power, P, needed to remove one $W_{thermal}$ of thermal power, q. It is noted that FIG. 2 is based on Carnot efficiency. Real air conditioners may use at least four times as much electrical energy as shown here. This may be expressed as an electrical-to-thermal power ratio, P/q, or as its reciprocal, the thermal efficiency:

$$\eta(T_{RES}) = \frac{q}{P} \quad (2)$$

The electrical power P consumed by the air conditioner 100 is the total thermal load $q_{MOVE}$ divided by the thermal efficiency $\eta(T_{RES})$ achievable at the exterior temperature $T_{RES}$:

$$P = \frac{(q_{LOAD} + q_{ENV})}{\eta(T_{RES})} \quad (3)$$

As can be seen from the foregoing equations, $\eta(T_{RES})$ and $q_{ENV}$ are the major variables that affect average electricity consumption, which, in turn, drives recurring cost.

Figure 3:
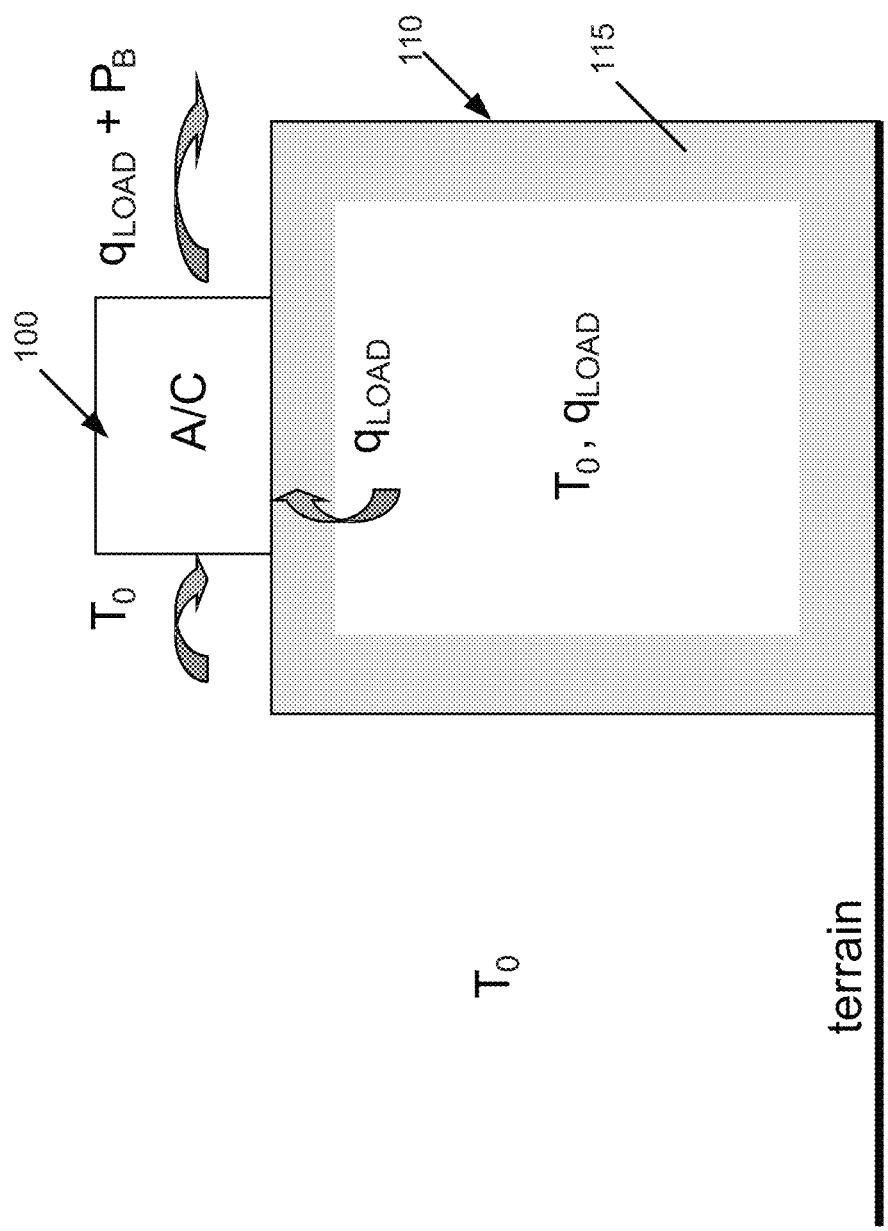
FIG. 3 illustrates the thermal power exchange that takes place in a building that maintains its indoor temperature on a day when the external air temperature is the same as the indoor temperature and there is no appreciable sunlight.

FIG. 3 illustrates the thermal power exchange that takes place in a building 110 that maintains its indoor temperature at $T_0$ on a day when the external air temperature is also $T_0$ and there is no appreciable sunlight. As shown, people and equipment in the building 110 are the principal producers of heat at the rate $q_{LOAD}$. The air conditioner 100 removes this heat from air at temperature $T_0$ and dumps it into exterior air at the same temperature. Power consumed, $P_B$, is relatively small because the thermal load is small and thermal efficiency is good.

Figure 4:
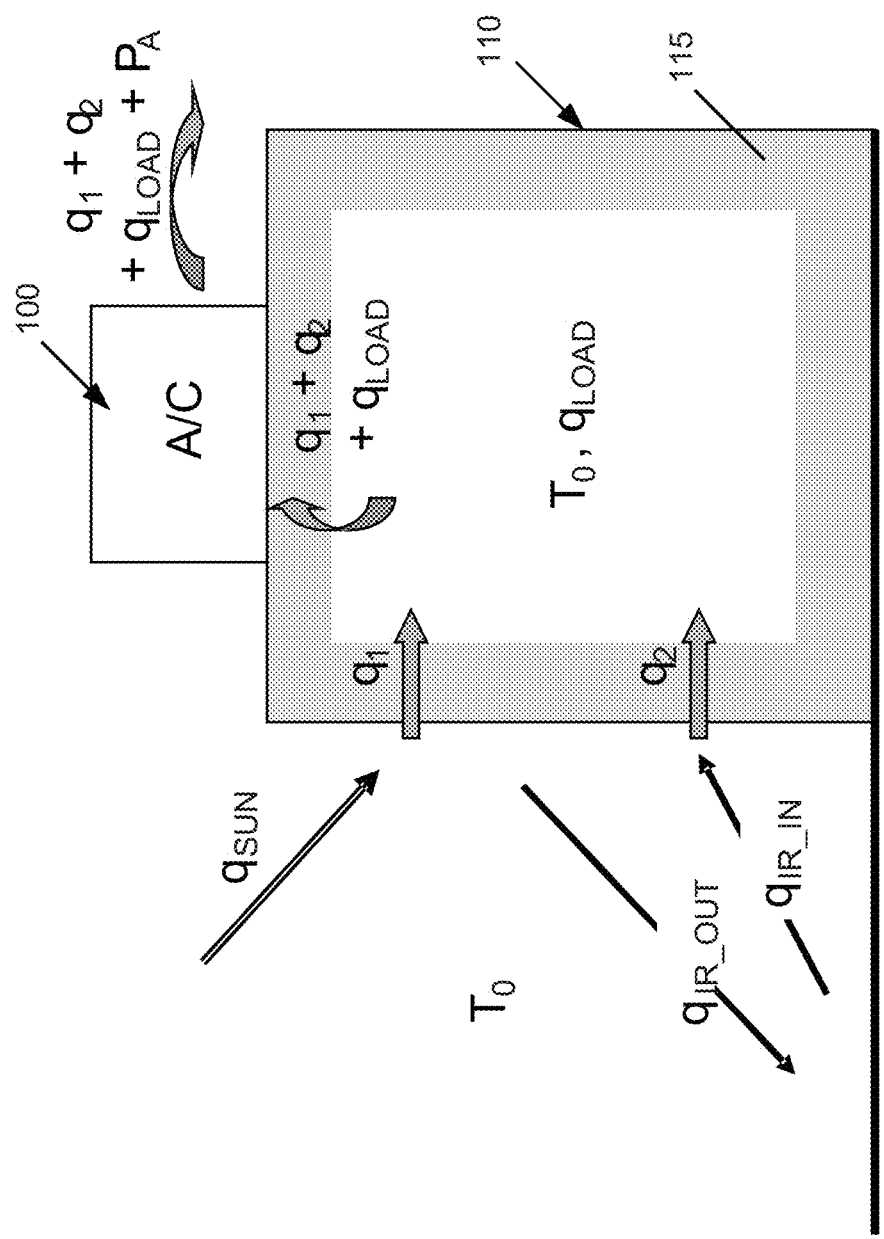
FIG. 4 shows the building of FIG. 3 when the building is exposed to sunlight.

FIG. 4 shows the same building 110 as that of FIG. 3. However, here the building is exposed to sunlight. The radiant power flow resulting from the sun striking the exterior of the building 110 is $q_{SUN}$. In this example, the building 110 has a dark exterior and non-reflective windows, so all of $q_{SUN}$ is absorbed. Part of this thermal power conducts through the wall 115 as heat flow q1. The rest radiates from the exterior of the building 110 as infrared flux $q_{IR\_OUT}$, which is partly absorbed by terrain or objects near the building. The terrain or objects re-radiate some of that absorbed heat toward the building 110 as infrared flux $q_{IR\_IN}$. A fraction of the infrared flux is absorbed and conducted through the wall 115 as heat flow q2.

Figure 5:
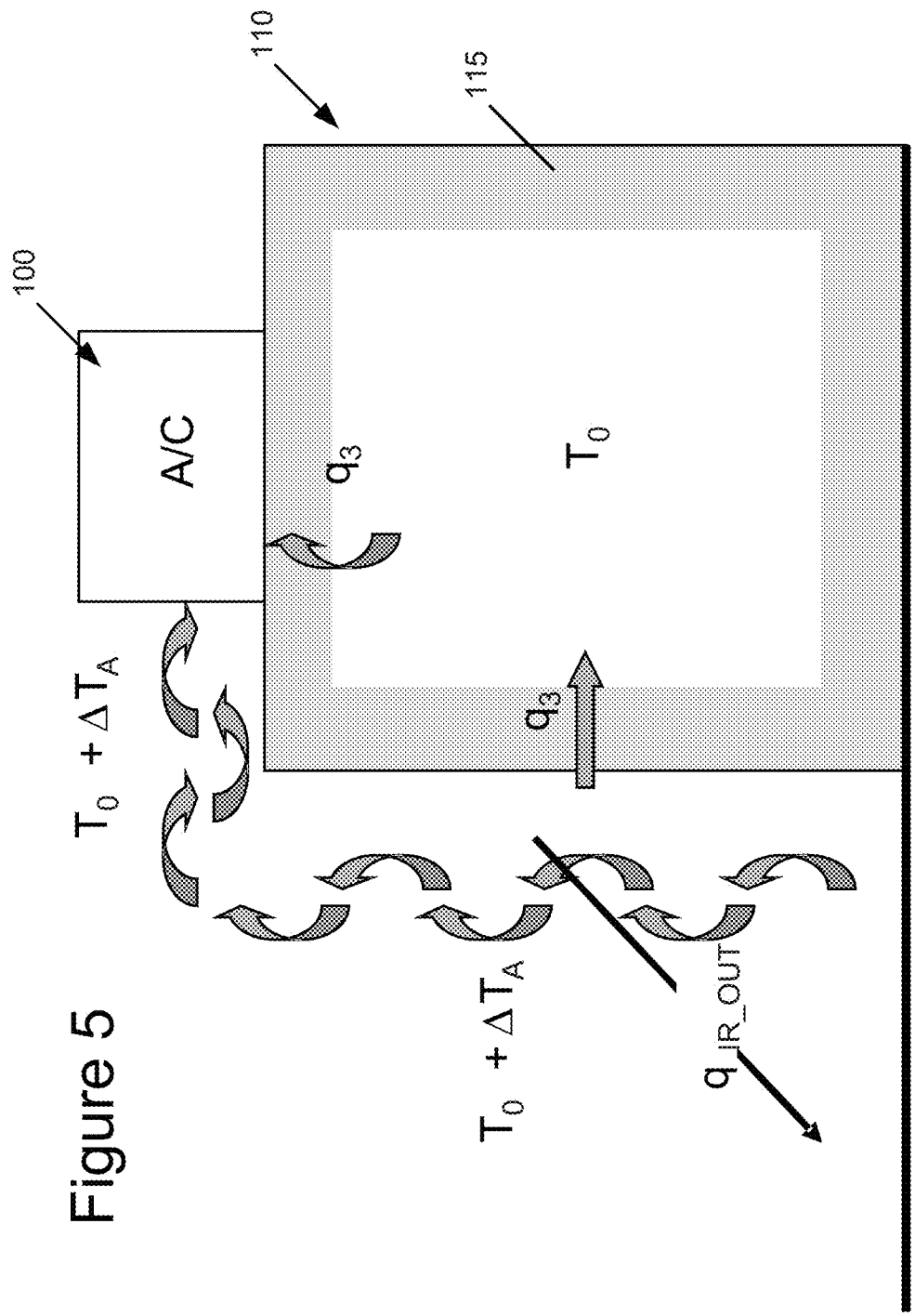
FIG. 5 shows the convective aspects of the example shown in FIG. 4.

The convective aspects of the example shown in FIG. 4 are shown in FIG. 5. The heat from $q_{IR\_OUT}$ that is not re-radiated heats the air near the building 110 resulting in an increase of the air temperature to $T_0+\Delta T_A$. The warmer air convects upward, transferring heat by conduction into and through the wall 115 as heat flux q3 and imposing a higher reservoir temperature $T_{RES}$ at the air conditioner 100.

The consequence of sunlight striking the building 110 is a higher thermal load on the air conditioner:

$$q_{MOVE}=q_{LOAD}+q1+q2+q3 \quad (4)$$

The resulting higher reservoir temperature may be expressed as:

$$T_{RES}=T_0+\Delta T_A \quad (5)$$

These two factors increase the peak capacity needed for the air conditioner 100. Assuming that more than one or two sunny days occur each year, the days may substantially increase the average power consumed by the air conditioner 100.

Figure 6:
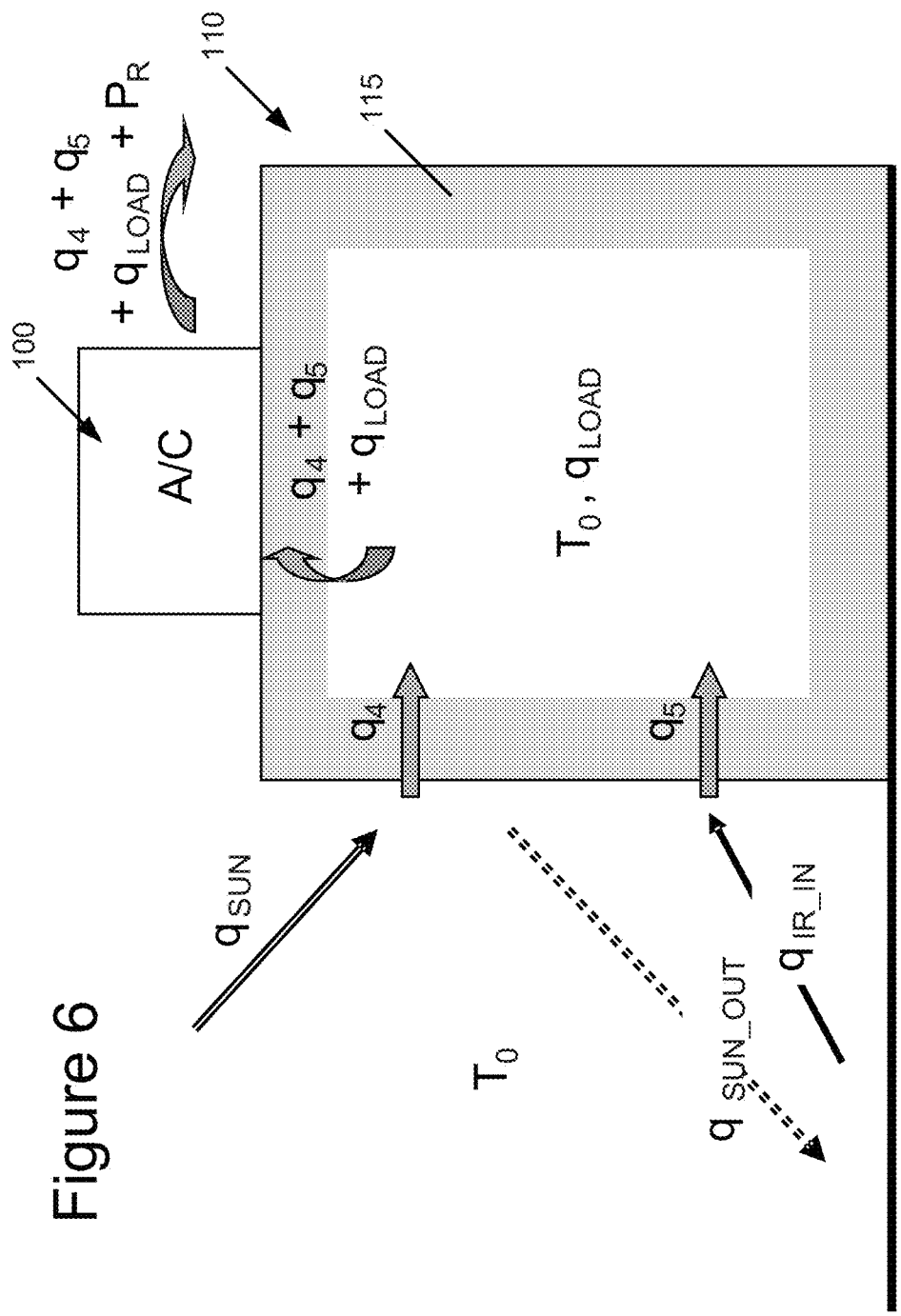
FIG. 6 illustrates the thermal power exchange that takes place in the building if the outside of the building is highly reflective.

FIG. 6 illustrates the thermal radiant power exchange that takes place in building 110 if the outside of the building is highly reflective (specular or diffuse), as opposed to the dark scenarios above. The thermal power of the sun striking the exterior of the building 110 is $q_{SUN}$. The building 110, for example, may have a light exterior and reflective-coated windows, so most of $q_{SUN}$ is reflected. Nonetheless, part of $q_{SUN}$ is absorbed as thermal power that conducts through the wall as heat flow q4. The rest reflects from the exterior as light flux $q_{SUN\_OUT}$, which is partly absorbed by terrain or objects near the building. The terrain or objects re-radiate some of that absorbed heat toward the building as infrared flux $q_{IR\_IN}$. A fraction of the infrared flux is absorbed and conducted through the wall as heat flow q5. As a practical matter, some of the visible light in $q_{SUN\_OUT}$ is reflected by terrain rather than absorbed, and some of that reflected light is absorbed by the building. This is included in $q_{IR\_IN}$ and q5.

Figure 7:
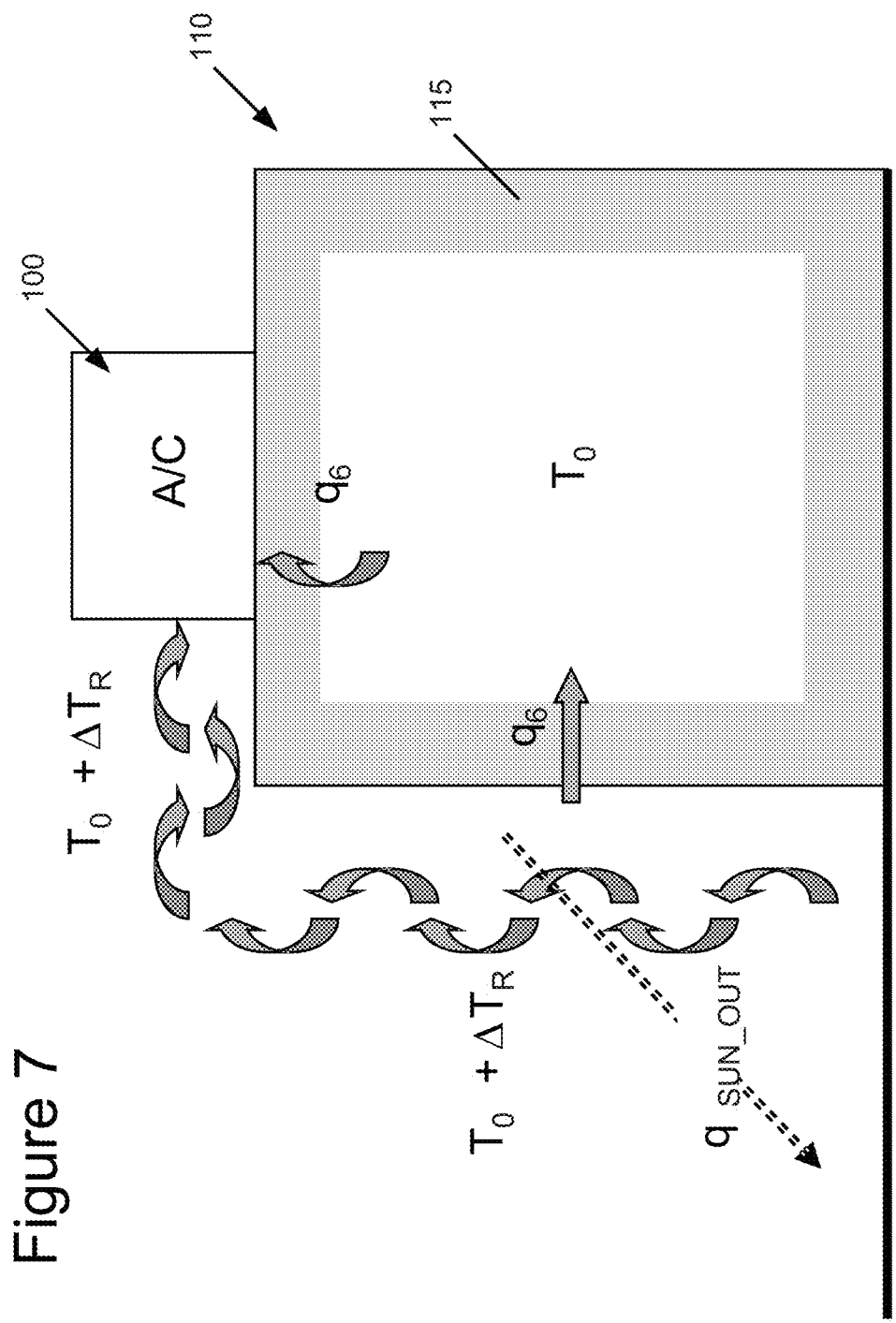
FIG. 7 shows the convective aspects of the example of FIG. 6.

The convective aspects of the example in FIG. 6 are shown in FIG. 7. The heat from $q_{SUN\_OUT}$ that is not re-radiated or reflected heats the air near the building 110. The air temperature rises to $T_0+\Delta T_R$. The warmer air convects upward, transferring heat by conduction into and through the wall 115 as heat flux q6 and imposing a higher reservoir temperature $T_{RES}$ at the air conditioner 100. The consequence of sunlight shining on the building 110 is a higher thermal load on the air conditioner corresponding to the following equation:

$$q_{MOVE}=q_{LOAD}+q4+q5+q6 \qquad (6)$$

and a higher reservoir temperature:

$$T_{RES}=T_0+\Delta T_R \qquad (7)$$

These two factors increase the peak capacity needed for the air conditioner 100. Again, assuming more than one or two sunny days occur each year, the average power consumed by the air conditioner 100 is substantially increased.

Figure 8:
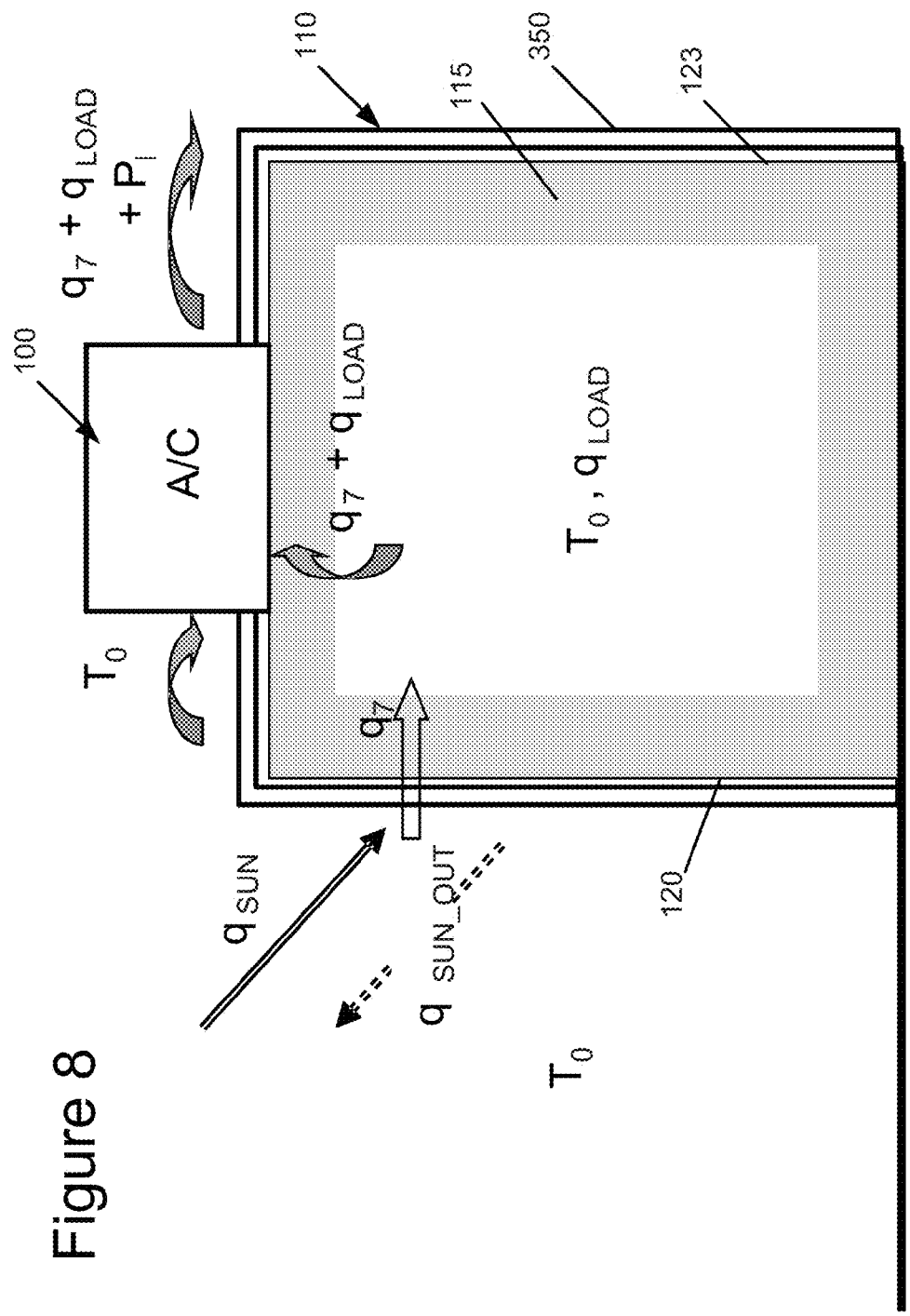
FIG. 8 shows a structure and method employing a covering to keep a building cool.

FIG. 8 shows a structure and method in which a covering 120 may be used to 1) keep the building 110 cool, 2) reduce the capacity needed for the air conditioner 100, and 3) reduce the reservoir temperature imposed on the air conditioner. The covering 120 is configured to inhibit electromagnetic beams at visible light wavelengths from the sun from reaching at least a portion of the surface 123 of the building 110. To this end, the covering 120 is configured to retroreflect visible light beams (e.g., electromagnetic radiation having wavelengths in a range between about 380 nm and about 780 nm, or a sub-range of such wavelengths) received along beam entry paths from the sun along beam exit paths that return the visible light beams in a direction toward the sun. In one example, the beam entry paths and the beam exit paths have substantially the same elevation angle with respect to the position of the sun along the horizon. The covering over 120 may exhibit this characteristic with respect to multiple horizontal positions of the sun during throughout the day to prevent the sun from heating the building 110 and nearby terrain. In another example, the covering 120 may be configured so that the beam entry paths and the beam exit paths also have the same azimuthal angle. Again, the covering 120 may exhibit this characteristic with respect to multiple azimuthal positions of the sun throughout the day. In this latter instance, the covering 120 directs substantially all of the received visible light beams directly back to the sun at both the vertical and azimuthal position of the sun in the sky. It is noted that a visible light beam along a beam entry path has a direction opposite to the direction of the visible light beam along a beam exit path.

In FIG. 8, the thermal power of the visible wavelengths of the sun reaching the covering 120 is $q_{SUN}$. Substantially all of $q_{SUN}$ is reflected back directly toward the sun by the cover 120 as light flux $q_{SUN\_OUT}$. Since the light flux $q_{SUN\_OUT}$ is reflected back to the sky at an elevation angle above the horizon, that light flux is not reflected toward nearby terrain. Whether or not the azimuthal component of the light flux $q_{SUN\_OUT}$ is retroreflected, the retroreflection of the elevation component of the light flux $q_{SUN\_OUT}$ is effective to minimize heating of the building 110, particularly during late morning and afternoon hours when the sun is at a large elevation angle with respect to the horizon. These times are often the hottest portions of day. Although a small amount of $q_{SUN}$ is absorbed as thermal power that conducts through the wall 115 as heat flow q7, this heat flow is minimal since most of the light flux $q_{SUN\_OUT}$ from the sun is blocked and never allowed to heat the surface 123 of the building 110. Further, since the amount of light flux $q_{SUN\_OUT}$ striking the terrain is minimal, the terrain does not receive extra heat to re-radiate or reflect toward the building 110 or to transfer to the air. As a result, no additional heat flux conducts into the building 110 through the wall 115, and the reservoir temperature $T_{RES}$ of air entering the air conditioner remains at $T_0$. Among other things, problems associated with indirect heat fluxes do not occur.

With reference to the exchanges shown in FIG. 8, the thermal load on the air conditioner 100 is:

$$q_{MOVE}=q_{LOAD}+q7 \qquad (8)$$

and the reservoir temperature is unchanged:

$$T_{RES}=T_0 \qquad (9)$$

As can be derived from these two equations, the peak capacity needed for the air conditioner 100 is reduced. Assuming more than one or two sunny days occur each year, these factors also reduce the average power consumed by the air conditioner 100.

In various applications, the covering 120 may be large enough and close enough to the building 110 to block sunlight from striking a substantial portion of the exterior surface 123 over the course of a hot day. This is shown in FIG. 8, where the sidewalls as well as the roof of the exterior surface 123 are shadowed with the cover 120. A cooling effect, however, may also be achieved by placing the covering 120 over only a limited portion of the surface 123. Further, in applications where the building 110 is close to neighboring buildings, the covering 120 may be applied on the roof of the building 110 to prevent a significant amount of scattered sunlight from reaching the other neighboring buildings.

The covering 120 of FIG. 8 may include a substrate, support structure, or the like that is covered, formed from, or embedded with a plurality of retroreflective elements. When the covering 120 is formed directly from the retroreflective elements, the retroreflective elements may be secured with one another without a substrate using a securement, a bonding process, or the like. As will be discussed in further detail below, the retroreflective elements may be constructed in a variety of different forms. However, such retroreflective elements generally have common characteristics such as:

1. Exhibiting significant reflection of electromagnetic radiation primarily at visible light wavelengths between about 380 to 780 nm, or in a sub-range of these wavelengths;
2. Having apertures that are large enough to return most of the reflected visible light beams back in the direction from which they were received, thereby minimizing diffractive beam spread and/or side lobe reflections;

3. Having high quality optical surfaces with, for example, a degree of flatness that allows the visible light beams to be reflected with limited scattering or aberrations; and 4. Having apertures small enough to ensure that most longer-wavelength energy from other non-solar sources, e.g. radio waves or sound waves, is scattered by diffracted beam spread and side lobes or is specularly reflected (not retro-reflected).

FIGS. 9 and 10 show a retroreflective element in the form of a corner cube reflector 125, a plurality of which may be used for the covering 120. The corner cube reflector 125 includes three mutually perpendicular reflective surfaces 130, 135, and 140. An arriving visible light beam enters the corner cube reflector 125 through an open face along a beam entry path shown by arrow 145. The visible light beam is reflected by the three surfaces 130, 135, and 140 before exiting the corner cube reflector 125 along the beam exit path shown by arrow 150. The visible light beam exiting along the beam exit path 150 has an elevation angle that is substantially the same as the elevation angle of the beam entry path 145 of the visible light beam. This allows the corner cube reflector 125 to reflect the visible light beams of the received sunlight back to the position of the sun with respect to the horizon. Further, the corner cube reflector 125 may also be configured so that the beam exit path shown at 150 is at an azimuthal angle that is substantially the same as the azimuthal angle of the beam entry path 145 of the visible light beam. This allows the corner cube reflector 125 to reflect the visible wavelengths of the received sunlight back to the azimuthal position of the sun in the sky. In those instances where the beam exit path 150 has both the same elevation angle and the same azimuthal angle as the beam entry path 145, the reflection is completely anti-parallel and substantially all of the visible light beams included in the electromagnetic radiation received from the sun are returned directly toward the position of the sun in the sky.

The corner cube reflector 125 may be designed so that it reflects visible light wavelengths principally in a range between about 380 and 780 nm. In the present example, wavelengths in a range centered roughly around 555 nanometers are used. These wavelengths correspond to the visible light wavelengths having the highest visible light power spectral density emitted from the sun. In order to reflect such wavelengths, the reflective surfaces 130, 135, and 140, may be coated with a reflective material such as silver and aluminum. Silver and/or aluminum have strong absorption resonances in the visible band. However, other suitable coatings may also be employed.

In determining the dimensions of the corner cube reflector 125, diffraction is minimized to so the reflected visible light beam exits the corner cube reflector 125 at an elevation angle that is parallel to, but in the opposite direction, of the visible light beam entering the corner cube reflector 125. Further, diffraction should be minimized so that the reflected visible light beam has an azimuthal angle parallel to, but in the opposite direction, of the azimuthal angle of the visible light beam entering the corner cube reflector 125. To this end, when a collimated electromagnetic radiation beam passes through an aperture, an effect called diffraction causes the collimated beam to spread into a wider beam having an angle, $\theta_{diff}$, measured from the center of the beam to the first null. Diffraction by the corner cube reflector 125 is minimized so that most of the visible light beams entering the reflector 125 from the sun are returned toward the position at which the sun is in the sky. If the amount of diffraction is too large, the reflected visible light beam may spread to a degree where much of it strikes nearby terrain. In turn, visible light beams striking the terrain contribute to heating of the building 110 by re-radiation of thermal power from the heated terrain to the building 110.

The angular width of a diffracted beam (i.e., the difference between the angle at which the visible light beam enters the retroreflective element and the angle at which it exits the retroreflective element) increases with the ratio of the wavelength 2 to the aperture width of each individual retroreflector element. This aspect of such an aperture is shown in FIG. 10 in terms of the distance $W_R$, which corresponds to the projected width of one face of the corner cube reflector 125. For a cubic reflector 125 with square facets, $W_R$ corresponds to the side length, s, for each facet according to the formula:

$$s = \frac{2}{\sqrt{3}} W_R \qquad (10)$$

Approximating the frontal shape of the corner cube reflector 125 as a circle corresponding to the effective aperture size, the Airy diffraction formula may be used to define the approximate lower bound of $W_R$ as:

$$W_R \geq 1.22 \frac{\lambda}{\theta_{max}} \qquad (11)$$

where λ may be selected so that it is in the range of visible light wavelengths. For example, λ may be selected so that it is in a range between about approximately 400 nm and 700 nm nanometers, and $\theta_{max}$ may be in a range between about 10° and 25°. Using apertures approximating these dimensions, the spread of visible light beams due to diffraction is reduced thereby also reducing the amount of reflected light striking nearby terrain. Apertures smaller than this may result in excessive diffraction, causing too much of the reflected visible light beam to spread out and strike nearby terrain. Excessive diffraction is particularly problematic when the sun is near the horizon so the retroreflective beam path is, at best, only a few degrees above the terrain. Apertures at least as large as this minimum bound are desirable for the corner cube reflector 125 to inhibit such diffraction.

When a visible light beam is reflected from a nominally flat surface, any deviation from flatness of the surface causes the beam to spread to a wider beam angle, $\theta_{error}$. If the reflected radiation spreads too widely (e.g. 10° in some cases, or as much as 25° in other cases) off-center when the sun is near the horizon at morning and evening), then much of it strikes nearby terrain and increases heating.

The total angular error $\theta_{error}$ for reflection from a corner cube reflector is the accumulated error of reflection from each of the three surfaces, $\theta_1$, $\theta_2$, and $\theta_3$. These errors are typically uncorrelated, so the total error is given by:

$$\theta_{error} = \sqrt{\theta_1^2 + \theta_2^2 + \theta_3^2} \qquad (12)$$

Assuming each of the three surfaces is finished to the same flatness, $\theta_{surface}$, then:

$$\theta_{error} = \sqrt{3\theta^2_{surface}} \qquad (13)$$

Once the maximum angular error $\theta_{max}$ is selected, then the upper bound on errors in surface flatness may be expressed as:

$$\theta_{surface} \le \frac{\theta_{max}}{\sqrt{3}} \qquad (14)$$

In various applications, the value for the maximum angular error may be about $\theta_{max}=10°$, but may be as high as, for example, 25° depending on the latitude at which the covering 120 is used. For surface errors larger than these, misalignment of the reflected light beam may result in an excessive amount of the visible light from the sunlight to strike nearby terrain when the sun, for example, is near the horizon. This criterion may be used as a parameter in designing the corner cube reflector 125.

A retroreflective element can potentially reflect a wide range of undesirable radiation other than visible light. As such, the retroreflective element may be configured to avoid reflecting radio waves and/or sound waves that might irritate or harm a person. For example, retroreflecting electromagnetic energy from a cell phone back to a user may add to the RF radiation that the phone imparts to the person. In turn, this may cause discomfort and/or increase health risks that may be associated with the RF transmissions of the phone. Further, reflecting audible sound wavelengths, such as those of a voice, back to a person may result in a strong echo with a short lag time making it difficult for a person to speak and/or hear. The audible sound wavelengths are generally in a range from about 17 mm to 17 meters, while undesirable radio frequency waves generally have wavelengths between about 7.5 cm and about 60 cm. To render the retroreflector elements more useful in a wide range of environments, the retroreflector elements may be dimensioned small enough to diffractively or specularly scatter electromagnetic radiation at these undesirable wavelengths, rather than retroreflect them back to an individual.

Any increase in the diffraction of the retroreflective element for radio frequency and sound wavelengths should be balanced against the constraints on the maintaining diffraction of sunlight wavelengths to a minimum. Accordingly, an exemplary maximum bound may be imposed on the effective dimension of the aperture in accordance with the following equation:

$$W_R \le \frac{1.22 \lambda_{rej} \Delta x}{W_t} \qquad (15)$$

This is the inverse of the requirement to not diffract sunlight too broadly, so the same general formula is used, but with a "less than" symbol rather than "greater than" relationship. Here, $\lambda_{rej}$ corresponds to the range of wavelengths for which retroreflection is to be limited, $W_t$ generally corresponds to a width of a person, and $\Delta x$ corresponds to the smallest distance from the retroreflective element at which a person is likely to spend appreciable time. If the aperture $W_R$ meets this criterion by a small margin, the undesirable radiation is diffractively scattered. If the aperture $W_R$ is smaller than about 1/10 the size prescribed by equation (15), then the undesirable radiation is specularly reflected from the covering 120.

Still further, it may be desirable to avoid retroreflection of thermal infrared energy. If terrain near the building emits thermal infrared energy, and the building retroreflects that infrared energy, then the terrain gets warmer, which, in turn heats the building. To avoid this, the retroreflective elements reflect visible light at a narrow diffraction angle using an aperture at least as large as the minimum bound noted above, but may also satisfy the criterion that:

$$W_R \le 1.22 \frac{\lambda_{IR}}{\theta_{IR}} \qquad (16)$$

The value for $\lambda_{IR}$ may be in a range between about 800 nm-1 mm. Here, a value of $\lambda_{IR}$ in a range around 7 μm to 12 μm is used (roughly corresponding to the wavelength of infrared radiation emitted from terrain on a hot day, and shorter than audible acoustic wavelengths), and $\theta_{IR}$ is the minimum acceptable diffraction angle, here in a range that is greater than about 30° up to 90°. Using these constraints, visible wavelengths of sunlight are retroreflected toward the sky, while longer wavelengths of thermal infrared energy are diffractively scattered or specularly reflected from the ground toward the sky. Consequently, both the terrain and the building stay relatively cooler.

Figure 11:
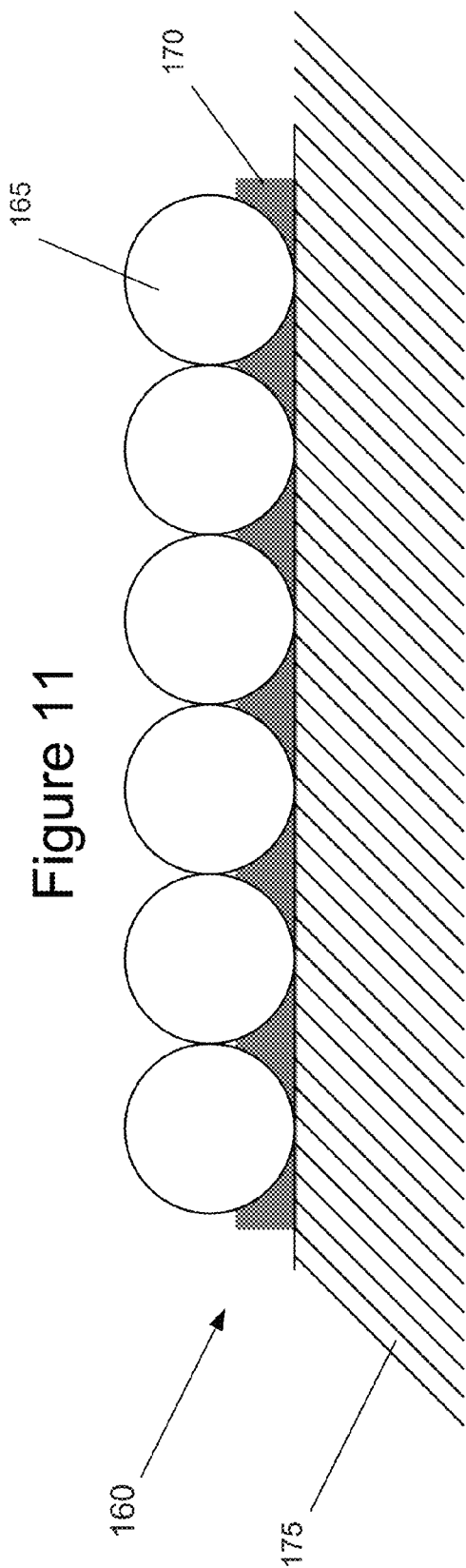
FIG. 11 shows a covering that includes retroreflective elements in the form of transparent beads.

The retroreflective elements of the covering 120 need not be in the form of reflective cubes. One such alternative is shown in FIG. 11, which shows a covering 160 that includes retroreflective elements in the form of transparent beads 165. The covering further includes an adhesive 170 and a panel/substrate 175 supporting a plurality of the transparent beads 165.

The transparent beads 165 may be formed from glass, clear plastic, or other material having similar optical properties. Incoming visible light beams enter a front portion of a bead in a parallel direction, and are subject to refraction at the front surface. Such visible light beams are reflected from the back surface after refraction and depart the front surface. The departing visible light beams are substantially parallel to the elevation angle of the arriving electromagnetic beams, and may also be substantially parallel to the azimuthal angle of the arriving visible light beams. The index of refraction of the beads 165 should be a between about 1.8 to 2.0, or another value that is higher than the index of refraction of standard glass, which is about 1.5. As such, the combined effect of the refraction and internal reflection of the transparent beads 165 is to return sunlight in a direction that is parallel to the direction at which it arrived, but in an opposite direction. The criteria set forth in Equations 10, 11, 15, and 16 above may be used as guidelines to determine the dimensions of the beads 165 having given optical characteristics.

The adhesive 170 may be selected from a number of different materials. Such materials include, for example, thermoplastic as well as plastic materials. Thermoplastic binder systems are based on one of several core chemistries: hydrocarbons, rosin esters, or maleic modified rosin esters (MMRE). The thermoplastic coatings are generally homogeneous dry mixes of binder resins, plasticizers, glass beads (or other optics), pigments, and fillers. However, any suitable adhesive may be used.

The covering 160 may be formed in a variety of different manners. One such manner includes coating the surface of panel 175 with adhesive 170. If adhesive 170 is a thermoplastic, the thermoplastic mix is heated to about 200° C. before being fed to an application apparatus. A fine mist of, for example, molten glass from an array of small apertures is sprayed into an inert gaseous atmosphere (e.g. argon) above the panel 175. If the gas is cool and the distance above the surface of the panel 175 is more than a few centimeters, the mist droplets cool and solidify into tiny spheres of glass before they reach the surface. The adhesive 170 grips the tiny spheres on its surface and the spheres solidify. If a more robust grip is needed for a particular application, the adhesive 170 is applied by a roller while the adhesive 170 is still soft. This presses the spheres further into the adhesive 170, increasing the adhesion. In forming the covering 160, a plastic tape may be laid over and secured to the surface 175 using an industrial-grade rubber cement.

Figure 12:
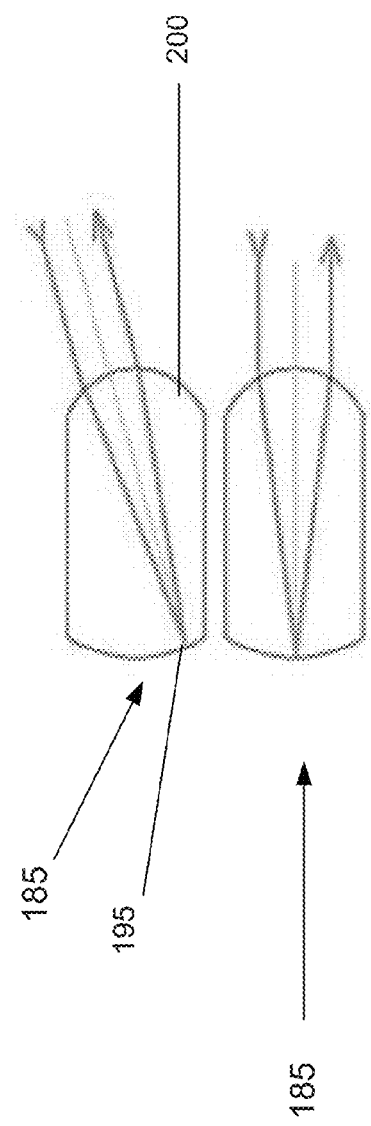
FIG. 12 shows a retroreflective element in the form of cat's eye retroreflector.

The transparent beads 165 may be replaced by cat's eye retroreflector elements, such as the elements 185 shown in FIG. 12. In such a retroreflector element 185, the back surface 195 has a larger radius than the front surface 200. In one type, the back surface 195 has radius that is twice as large the radius of the front surface 200. The distance between the two surfaces may be the same as if a small sphere and a sphere twice as large had each been cut in half, and the flat face of the smaller sphere were glued to the center of the flat face of the larger sphere. This gives a retroreflection in the visible wavelengths of sunlight when the cat's eye retroreflector element material has an index of refraction between about 1.4 and 1.6.

Figure 13:
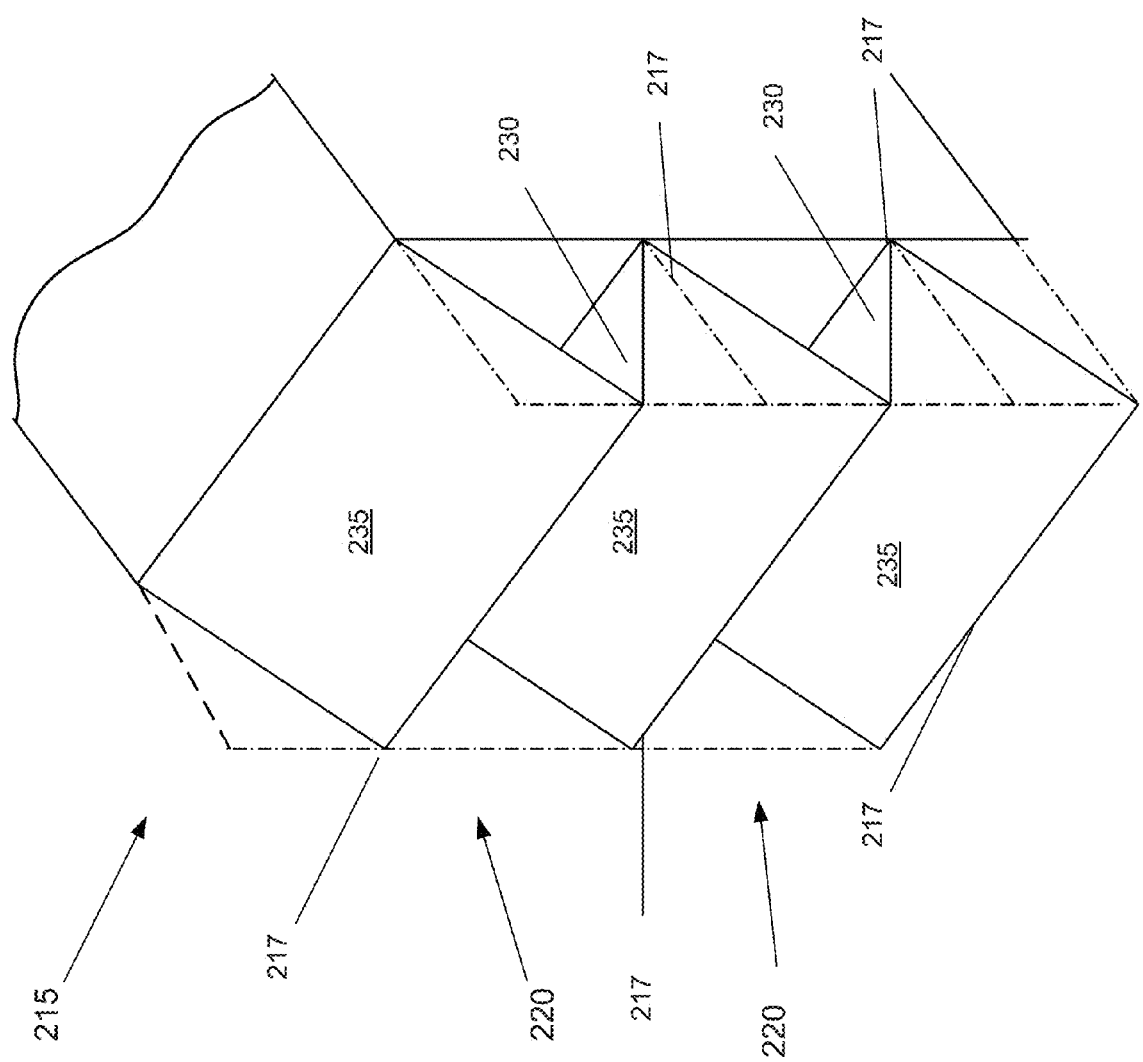
FIGS. 13 and 14 show a covering in the form of a trough reflector.
Figure 14:
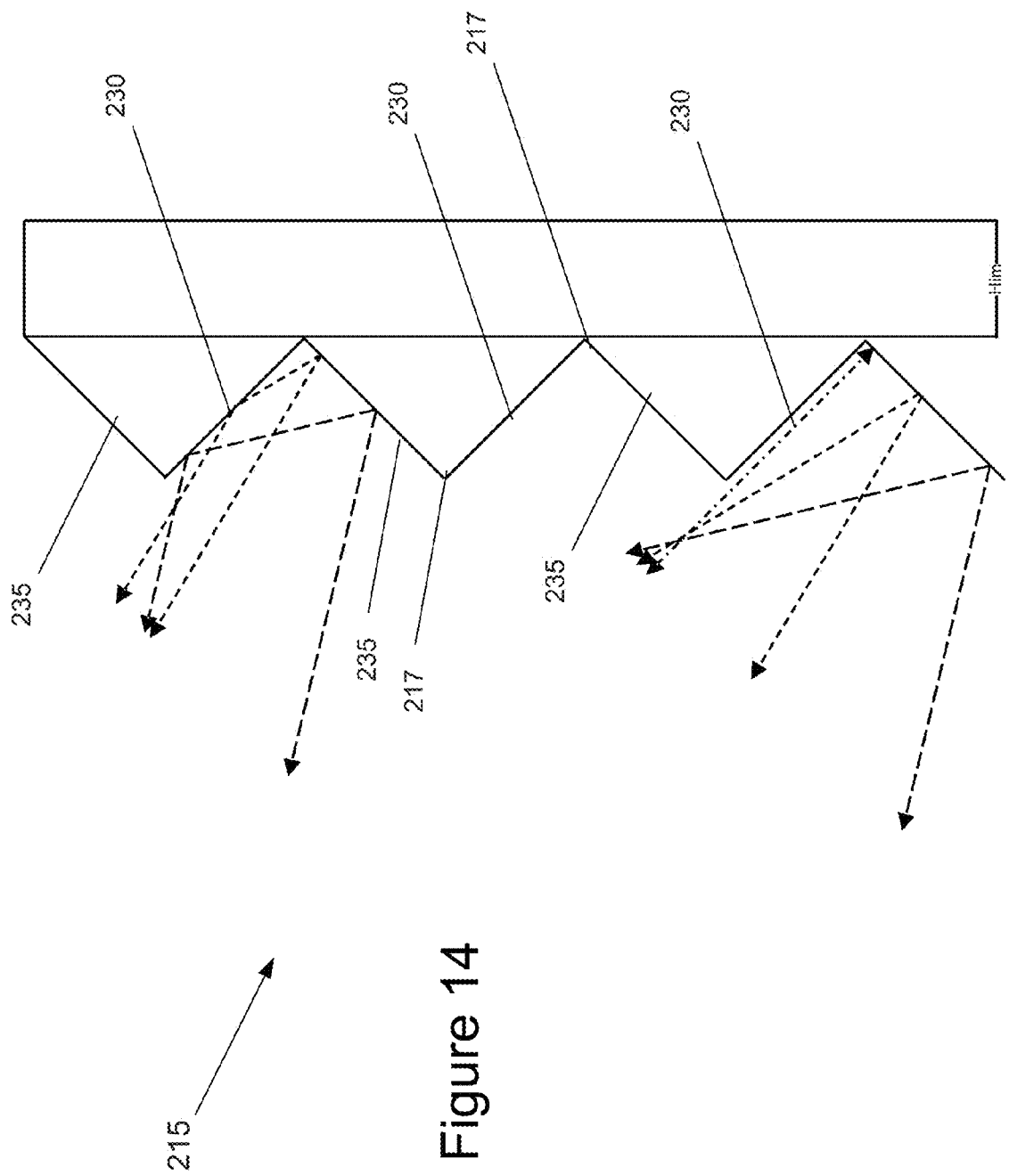

FIGS. 13 and 14 show a covering in the form of a trough reflector 215 comprised of a plurality of horizontal troughs 220. All light paths shown in FIGS. 13 and 14 are bidirectional, i.e., visible light beams can arrive along either path and depart on the other. Consequently, each path is illustrated with an arrowhead at each end.

The horizontal troughs 220 are arranged to reflect visible light beams along a path having the same elevation angle at which the visible light beams enter the horizontal trough 220. However, such horizontal troughs 220 may also reflect the received visible light beams at an azimuthal angle that is different from the azimuthal angle at which the visible light beams enter the horizontal trough 220. Nevertheless, returning the received visible light beams at the same elevation angle as the elevation angle at which the visible light beams are received still reduces the heating of the terrain near the building regardless of the azimuthal angle at which the visible light beams exit the horizontal trough 220.

The horizontal troughs 220 of FIGS. 13 and 14 each include a set of alternating perpendicular faces. In the illustrated example, each horizontal trough 220 has two faces 230 and 235 of equal size. Each face 230 and 235 may be oriented at 45° from horizontal, one with its reflective surface upward, and the other with its reflective surface downward. The horizontal troughs 220 may be further oriented to let water and dust flow out of them in a manner so that faces 230 and 235 stay clean.

For any angular sun position above the horizon, reflected visible light beams leave the trough reflector 220 at an elevation angle that is above the horizon. Reflections may be single reflections or double reflections. In the case of double reflections, such as the reflections shown at the top of FIG. 14, visible light beams leave the horizontal trough 220 as reflected light beams at the same elevation angle at which the light beams are received from the sun. In the case of single reflections, such as the reflections shown in the lower portion of FIG. 14, visible light beams leave the horizontal trough 220 as reflected light beams at a different elevation angle than the elevation angle at which the visible light beams enter from the sun. However, the elevation angle at which the reflected light beams exit the horizontal trough 220 is still above the horizon.

In one example, a plurality of the trough reflectors 220 may be bendable about their respective horizontal centerlines 217 to allow folding of the trough reflector 215, or portions thereof, for portability. Folding of the trough reflector 215 may be desirable, since the trough reflector 215 may include dozens or even hundreds of individual horizontal troughs 220 that may be folded over one another.

Figure 15:
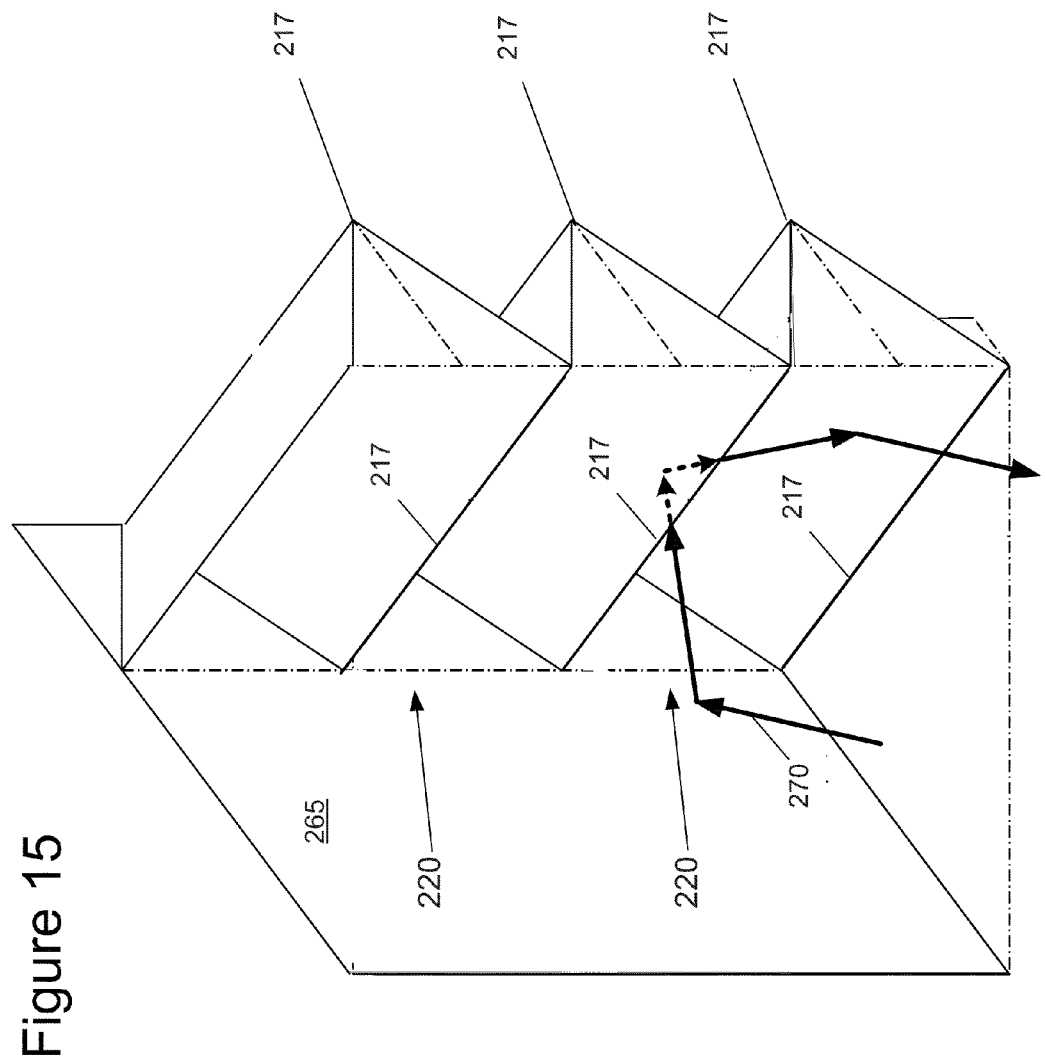
FIG. 15 shows a modified version of the covering shown in FIGS. 12 and 13.

FIG. 15 shows a modified version of the covering shown in FIGS. 13 and 14. Unlike the examples shown in FIGS. 13 and 14, however, the example of FIG. 15, includes a reflective wall 265 disposed adjacent the plurality of horizontal troughs 220. A plurality of reflective walls 265 may be disposed along a length of the covering to vertically divide the horizontal troughs 220. Further, a plurality of reflective walls 265 may horizontally separate different pluralities of horizontal troughs 220. As shown by arrows 270, the azimuth angle as well as the elevation angle of the exiting visible light rays are both generally the same as, but in an opposite direction to the azimuthal angle and elevation angle the entering visible light rays when one or more reflective walls 265 are used. Although shown as a single light beam path 270, the light beam reflection path is bidirectional. Again, Equations 10, 11, 15 and 16 may be used as guidelines to determine the dimensions of the troughs 220 and their relationship with each reflective wall 265.

Another example uses a plurality of transparent fibers or prisms, each with a cross-section shaped like a circle, a cat's eye reflector, or a 90° trough behind a flat plate. The fibers are oriented horizontally on the covering 120. A vertical section view through the covering 120 with circular fibers is similar to the structure shown in FIG. 11. This example, like the trough retro-reflectors described above, retro-reflects light to the sky with the same elevation angle at which it arrived, but typically does not reflect it along the same azimuthal angle.

Figure 16:
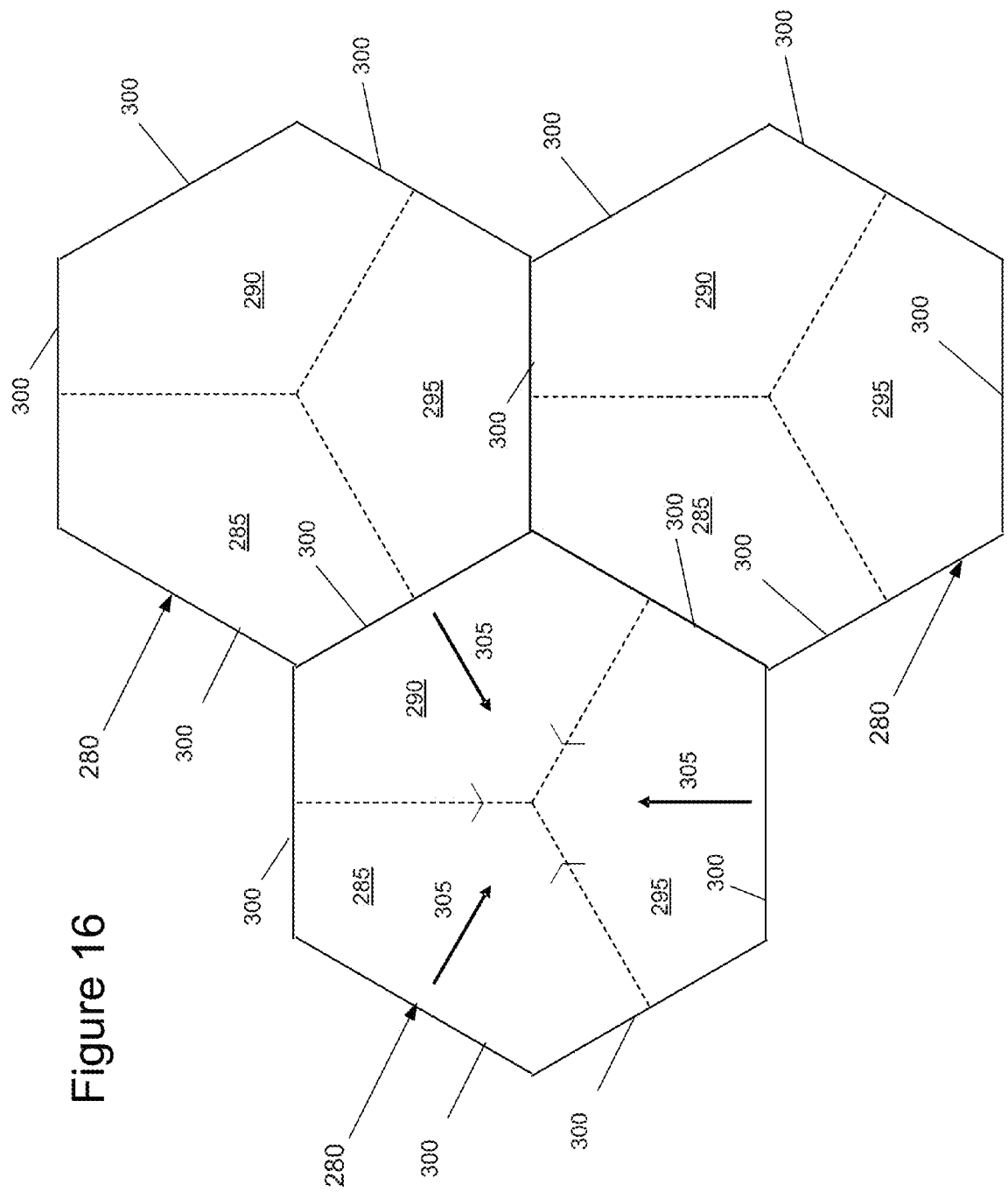
FIGS. 16 and 17 illustrate other corner cube reflector examples, each having a slightly different arrangement of surfaces.
Figure 17:
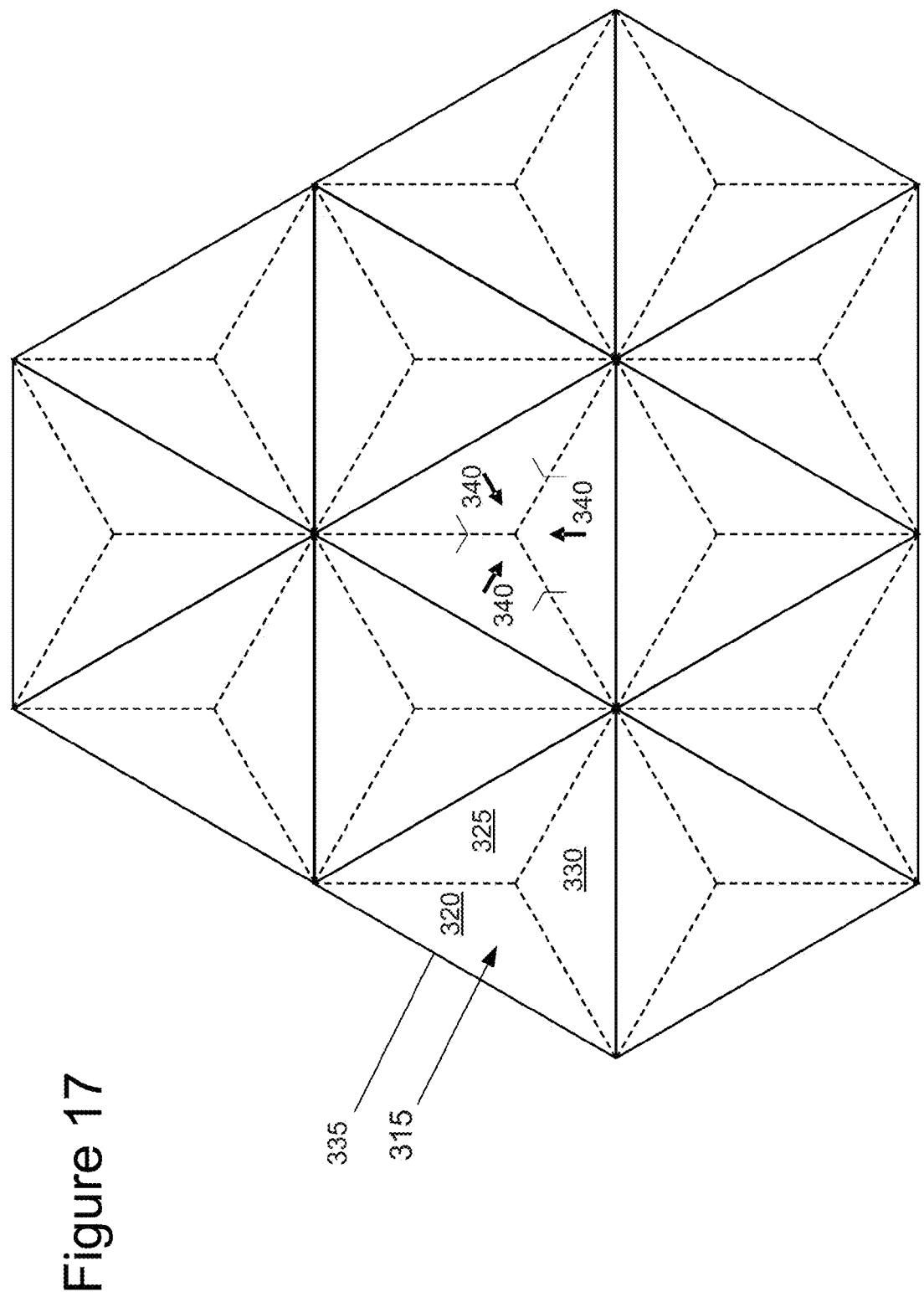

FIGS. 16 and 17 show other corner cube reflectors, each having slightly different arrangement of surfaces. In FIG. 16, the corner cube reflectors 280 each include a plurality of pentagonal faces 285, 290, and 295 having outermost edges 300 defining a hexagonal opening. The faces slope into the page in the direction of arrows 305. Each face joins with its adjacent faces at interior angles of between about 84° to 96°.

In FIG. 17, the corner cube reflectors 315 each include a plurality of faces 320, 325, and 330 having respective outermost edges 335 defining a triangular opening. The faces slope in into the page in the direction of arrows 340. Each face joins with its adjacent faces at interior angles of approximately 84° to 96°.

The covering 120 may also include various modifications and/or enhancements. For example, referring again to FIG. 8, the covering 120 may be shrouded with a transparent sheet 350 that protects it from dust and renders it easier to clean compared to complex reflective surfaces alone. The sheet 350 may be transparent to visible light wavelengths but reflective to thermal infrared wavelengths. This latter characteristic facilitates specular reflection of infrared heat, while concurrently reducing the constraints on aperture size. The covering 120 may be manufactured as part of sheet 350, e.g., by molding retroreflective elements into the side sheet 350 that faces toward building 110.

The foregoing covering 120 may also be used and/or manufactured in different manners. For example, the covering 120 may be provided in a form that comprises a set of panels that are individually attached to the building 110. For example, the covering 120 may be provided in the form of roof panels, siding, or other form typically used to construct a building.

A variety of methods can be used to manufacture the panels, e.g., stamping sheet metal into the desired shape, hot-pressing sheets of aluminized plastic, or using plastic injection molding to make the structure and then depositing a reflective coating on it.

In applications in which building 110 effectively becomes part of the terrain relative to nearby buildings, the covering 120 may be applied on its roof to ensure that scattered sunlight does not strike on other neighboring buildings.

The features, functions, and advantages that have been discussed can be achieved independently in various embodiments or may be combined in yet other embodiments. For example, without limitation, the enclosure may include buildings such as houses, office buildings, grain silos, hangars, or warehouses; vehicles such as airplanes, trucks, trains, cars, boats, or ships; tanks of gas or liquid such as water, natural gas, or petroleum; or pipelines. Other enclosures are likewise within the scope of the present embodiments.

The invention claimed is:

1. An apparatus for inhibiting heating of an enclosure, the apparatus comprising:
a covering configured to shade at least a portion of a surface of the enclosure,
wherein the covering includes a plurality of retroreflective elements configured to retroreflect electromagnetic beams primarily at wavelength in a range between about 380 nm and about 780 nm or sub-range thereof,
wherein the plurality of retroreflective elements receives the electromagnetic beams along beam entry paths and reflect the electromagnetic beams along beam exit paths, wherein the beam entry paths and the beam exit paths have substantially a same elevation angle, and
wherein the plurality of retroreflective elements includes a plurality of horizontal troughs having reflective surfaces and a plurality of reflective walls disposed along a length of the covering to vertically divide the horizontal troughs.

2. The apparatus claim 1, wherein the plurality of retroreflective elements includes retroreflective elements configured to scatter audible sound wavelengths, wherein the scattering is one of specular reflecting and diffuse scattering.

3. The apparatus of claim 2, wherein the plurality of retroreflective elements includes retroreflective elements configured to scatter audible sound wavelengths that are in a range from about 17 mm to about 17 meters.

4. The apparatus of claim 1, wherein the plurality of retroreflective elements includes retroreflective elements configured to scatter electromagnetic energy at wavelengths between about 780 nm and 1 mm, or sub-range thereof, wherein the scattering is one of specular reflecting and diffuse scattering.

5. The apparatus of claim 4, wherein the plurality of retroreflective elements includes retroreflective elements configured to scatter thermal infrared energy at wavelengths in a range between about 7 μm and 12 μm, or sub-range thereof.

6. The apparatus of claim 1, wherein the plurality of retroreflective elements includes a plurality of corner cube reflectors.

7. The apparatus of claim 6, wherein the plurality of corner cube reflectors includes corner cube reflectors having triangular openings to receive the electromagnetic beams.

8. The apparatus of claim 6, wherein the plurality of corner cube reflectors includes corner cube reflectors having hexagonal openings to receive the electromagnetic beams.

9. The apparatus of claim 1, wherein each horizontal trough comprises a first reflective surface and a second reflective surface, wherein the first and second reflective surfaces are arranged at an angle between about 84° and 96° with respect to one another.

10. The apparatus of claim 1, wherein at least one of the plurality of horizontal troughs is foldable about respective horizontal centerlines to facilitate portability of the plurality of horizontal troughs.

11. The apparatus of claim 1, wherein the beam entry path and the beam exit path have substantially a same azimuthal angle.

12. The apparatus of claim 1, wherein the covering comprises:
a substrate;
a plurality of transparent beads; and
an adhesive securing the plurality of transparent beads to the substrate.

13. The apparatus of claim 1, wherein the covering comprises:
a substrate;
a plurality of transparent fibers; and
an adhesive securing the plurality of transparent fibers to the substrate.

14. An apparatus for inhibiting heating of an enclosure, the apparatus comprising:
a covering configured to cover at least a portion of a surface of the enclosure, the covering including a plurality of corner cube reflector elements configured to reflect electromagnetic beams at wavelengths primarily in a range between about 380 nm and about 780 nm or sub-range thereof,
wherein the plurality of corner cube reflector elements each having an effective aperture specifically sized to retroreflect electromagnetic beams at wavelengths primarily in a range between about 380 nm and about 780 nm or sub-range thereof and to reflect thermal infrared energy, wherein the reflecting is one of specular reflecting and diffuse reflecting, the effective aperture size corresponding to:

$$W_R \geq 1.22 \lambda / \theta_{max}$$

where λ is in a range between about 380 nm and 1000 nm, or sub-range thereof, $\theta_{max}$ is in a range between about 10° and 25°, and $W_R$ corresponds to a mean distance the electromagnetic beam travels between successive faces of the corner cube reflector element;
wherein the plurality of reflective cube reflector elements receives the electromagnetic beams along beam entry paths and reflect the electromagnetic beams along beam exit paths, and
wherein the beam entry paths and the beam exit paths have substantially a same elevation angle with respect to horizontal.

15. The apparatus of claim 14, wherein the covering includes corner cube reflector elements configured to retroreflect electromagnetic beams primarily in wavelengths centered between about 380 nm and 1000 nm, sub-range thereof.

16. The apparatus of claim 14, wherein the plurality of corner cube reflector elements includes cube reflector elements having an effective aperture size dimensioned to scatter audible sound wavelengths wherein the scattering is one of specular reflecting and diffuse scattering.

17. The apparatus of claim 16, wherein the effective aperture sizes are dimensioned to scatter audible sound wavelengths that are in a range from about 17 mm to about 17 meters.

18. The apparatus of claim 14, wherein the plurality of cube reflector elements includes corner cube reflector elements having aperture sizes that are dimensioned to reflect electromagnetic energy at wavelengths between about 1000 nm and 2 meters, wherein the reflecting is one of specular reflecting and diffuse reflecting.

19. The apparatus of claim 18, wherein the plurality of corner cube reflector elements includes corner cube reflector elements having aperture sizes that are dimensioned to scatter thermal infrared energy at wavelengths in a range between about 7 µm to 13 µm.

20. The apparatus of claim 14, wherein the plurality of corner cube reflector elements each including a plurality of pentagonal faces having outermost edges defining a hexagonal opening.

21. A method for directing thermal infrared energy toward or away from a target, the method comprising:
placing a covering in a position to shadow at least a portion of a surface of the enclosure from electromagnetic energy, the covering comprising a plurality of retroreflective elements; and
retroreflecting electromagnetic beams from the covering primarily visible light at wavelengths in a range between about 380 nm and about 1000 nm or sub-range thereof, wherein the covering receives the electromagnetic beams along beam entry paths and reflects the electromagnetic beams along beam exit paths, wherein the beam entry paths and the beam exit paths have substantially a same elevation angle;
wherein the plurality of retroreflective elements includes a plurality of horizontal troughs having reflective surfaces and a plurality of reflective walls disposed along a length of the covering to vertically divide the horizontal troughs.

22. The method of claim 21, wherein the beam entry paths and the beam exit paths further have substantially a same azimuthal angle.

23. The method of claim 21, further comprising reflecting audible sound wavelengths with the covering, wherein the reflecting is one of specular reflecting and diffuse reflecting.

24. The method of claim 21, further comprising reflecting electromagnetic radiation having a wavelength longer than visible light with the covering, wherein the reflecting is one of specular reflecting and diffuse reflecting.

25. The method of claim 21, further comprising reflecting thermal infrared energy with the covering, wherein the covering includes a sheet transparent to visible light and reflective to infrared light, wherein the reflecting is one of specular reflecting and diffuse reflecting.

* * * * *